US 6,747,229 B2

(12) United States Patent
Carlson

(10) Patent No.: US 6,747,229 B2
(45) Date of Patent: Jun. 8, 2004

(54) INPUT/OUTPUT JOB TAGGING READABLE BY MOBILE INPUT/OUTPUT BINS

(75) Inventor: Gerard J. Carlson, Boise, ID (US)

(73) Assignee: Hewlett-Packard Development Company, LP., Houston, TX (US)

( * ) Notice: Subject to any disclaimer, the term of this patent is extended or adjusted under 35 U.S.C. 154(b) by 194 days.

(21) Appl. No.: 10/056,969

(22) Filed: Jan. 24, 2002

(65) Prior Publication Data

US 2003/0136712 A1 Jul. 24, 2003

(51) Int. Cl.[7] .................................................. G06K 9/00
(52) U.S. Cl. .................... 209/583; 198/370.01; 700/224
(58) Field of Search ....................... 198/370.01–370.09; 209/583; 700/224

(56) References Cited

U.S. PATENT DOCUMENTS

| | | | |
|---|---|---|---|
| 4,007,843 A | 2/1977 | Lubbers et al. ......... 214/16.4 B |
| 4,688,678 A | * 8/1987 | Zue et al. .................... 209/552 |
| 4,894,908 A | 1/1990 | Haba, Jr. et al. .............. 29/711 |
| 5,342,034 A | 8/1994 | Mandel et al. |
| 5,431,600 A | 7/1995 | Murata et al. |
| 5,525,031 A | 6/1996 | Fox ........................ 414/789.7 |
| 5,629,672 A | 5/1997 | Brown et al. |
| 5,793,298 A | 8/1998 | Matsuura |
| 5,803,704 A | 9/1998 | Lazzarotti ................ 414/793.4 |
| 5,804,804 A | 9/1998 | Fukatsu et al. |
| 5,896,297 A | 4/1999 | Valerino, Sr. .......... 364/478.01 |
| 5,961,571 A | 10/1999 | Gorr et al. ................... 701/207 |
| 5,990,437 A | * 11/1999 | Coutant et al. ............. 209/583 |
| 6,006,237 A | 12/1999 | Frisbey ....................... 707/104 |
| 6,014,649 A | 1/2000 | Kobayashi et al. |
| 6,060,992 A | 5/2000 | Huang et al. ............... 340/674 |
| 6,168,145 B1 | 1/2001 | Tanaka et al. |
| 6,202,004 B1 | 3/2001 | Valerino, Sr. .............. 700/218 |
| 6,216,053 B1 | 4/2001 | Cureton et al. ............. 700/104 |
| 6,459,061 B1 | * 10/2002 | Kugle et al. ................ 209/583 |
| 6,460,681 B1 | * 10/2002 | Coutant et al. ........ 198/370.04 |
| 6,498,454 B1 | 12/2002 | Pinlam et al. |

* cited by examiner

Primary Examiner—Donald P. Walsh
Assistant Examiner—Kaitlin Joerger
(74) Attorney, Agent, or Firm—James R. McDaniel

(57) ABSTRACT

This invention relates to self-propelled, mobile input/output bins (MIOB). Such structures of this type, generally, allow the MIOB to scan/read machine readable data on an input/output job banner page. This information allows the MIOB to determine the owner of the input/output job, the owner's location, and the location where the input/output job is to be delivered so that the input/output job can be delivered by the MIOB.

20 Claims, 2 Drawing Sheets

INPUT/OUTPUT JOB TAGGING READABLE BY MOBILE INPUT/OUTPUT BINS

FIELD OF THE INVENTION

This invention relates to self-propelled, mobile input/output bins (MIOB). Such structures of this type, generally, allow the MIOB to scan/read machine readable data on an input/output job banner page. This information allows the MIOB to determine the owner of the input/output job, the owner's location, and the location where the input/output job is to be delivered so that the input/output job can be delivered by the MIOB.

DESCRIPTION OF THE RELATED ART

As printer manufacturers move into the larger, higher speed pages per minute market, the printers will need more attention from the data center or other technical support personnel. For example, it is common that high-speed printers can consume a ream of paper every 10 minutes. Consequently, even with a 2500 page input bin, this high-speed printer will need paper replenishment in less than an hour. To compound this even further, the output bin is an even larger problem because it may need to be emptied several times an hour. Therefore, a more advantageous system, then, would be presented if a self-propelled, mobile input/output bin (MIOB) could be utilized to service these higher volume printers.

It is known, in the printing art, to employ an automated print job distribution system for a shared user centralized printer. Exemplary of such prior art is U.S. Pat. No. 5,525,031 ('031) to E. D. Fox, entitled "Automated Print Jobs Distribution System for Shared User Centralized Printer." While the '031 reference teaches the use of a mobile, vehicular mail boxing module that interacts with a printer in order to collect and distribute print jobs, it does not teach, suggest or even appreciate the use of a MIOB for reading/scanning machine readable data on an input/output job banner page.

It is also known to employ a variety of communication systems that allow for communication between a central control station and automated guided vehicles (AGVs). Exemplary of such prior art is U.S. Pat. No. 4,894,908 ('908) to A. R. Haba, Jr. et al., entitled "Method of Automated Assembly of Assemblies Such As Automotive Assemblies and System Utilizing Same." While the '908 reference discloses the use of a communication system between a cell controller and an AGV, it does not teach, suggest or even appreciate the use of a communication system that allows a data center to communicate with a MIOB in order that the MIOB can determine the owner of the input/output job, the owner's location, and the other possible locations where the input/output job may be delivered by the MIOB.

Finally, it is known, in the semiconductor art, to employ a mobile work-in-parts tracking system. Exemplary of such prior art is U.S. Pat. No. 6,060,992 ('992) to C. Y. Huang et al., entitled "Method and Apparatus for Tracking Mobile Work-In-Process Parts." While the '992 reference discloses the use of a mobile carrier in a semiconductor facility that can read a liquid crystal display (LCD) tag located on the pods that are used to transfer material from station to station, this reference does not teach, suggest, or even appreciate the use of machine readable data located on a banner page of an input/output job such that a MIOB can scan/read the banner page in order that the MIOB can determine the owner of the input/output job, the owner's location, and the other possible locations where the input/output job may be delivered by the MIOB. The above-identified prior art references are hereby incorporated by reference, in their entirety.

It is apparent from the above that there exists a need in the art for an input/output job distribution system for a printer or other such consumable handling devices, which at least equals the input/output job distribution systems of the prior art, but which at the same time employs the use of a self-propelled MIOB that can scan/read machine readable data on an input/output banner page in order that the MIOB can determine the owner of the input/output job, the owner's location, and the other possible locations where the input/output job may be delivered by the MIOB. It is a purpose of this invention to fulfill this and other needs in the art in a manner more apparent to the skilled artisan once given the following disclosure.

SUMMARY OF THE INVENTION

Generally speaking, this invention fulfills these needs by providing a method for automated input/output job distribution, comprising the steps of: detecting an input/output job at a consumable handling device; reading a machine readable data located on an input/output job cover page means by a self-propelled, mobile input/output bin; and determining an owner of the input/output job through the use of the bin.

In certain preferred embodiments, the consumable handling device can be, but is not limited to, a printer, a printing device, a media handling device or the like. Also, the input/output job can be, but is not limited to, a print job, a scan job, a fax, a copy or the like. Finally, the machine readable data can be, but is not limited to, a bar code, magnetic ink, a RF tag, hand printing, mark-sense systems or the like.

In another further preferred embodiment, the self-propelled, mobile input/output bin (MIOB) provides a fast, efficient means to transfer the input/output job between various consumable handling devices without having to involve other support personnel.

The preferred method, according to this invention, offers the following advantages: ease of input/output job transfer; improved economy; increased efficiency; and reduced downtime. In fact, in many of the preferred embodiments, these factors of ease of input/output job transfer, increased efficiency and reduced downtime are optimized to an extent that is considerably higher than heretofore achieved in prior, known output job distribution systems.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
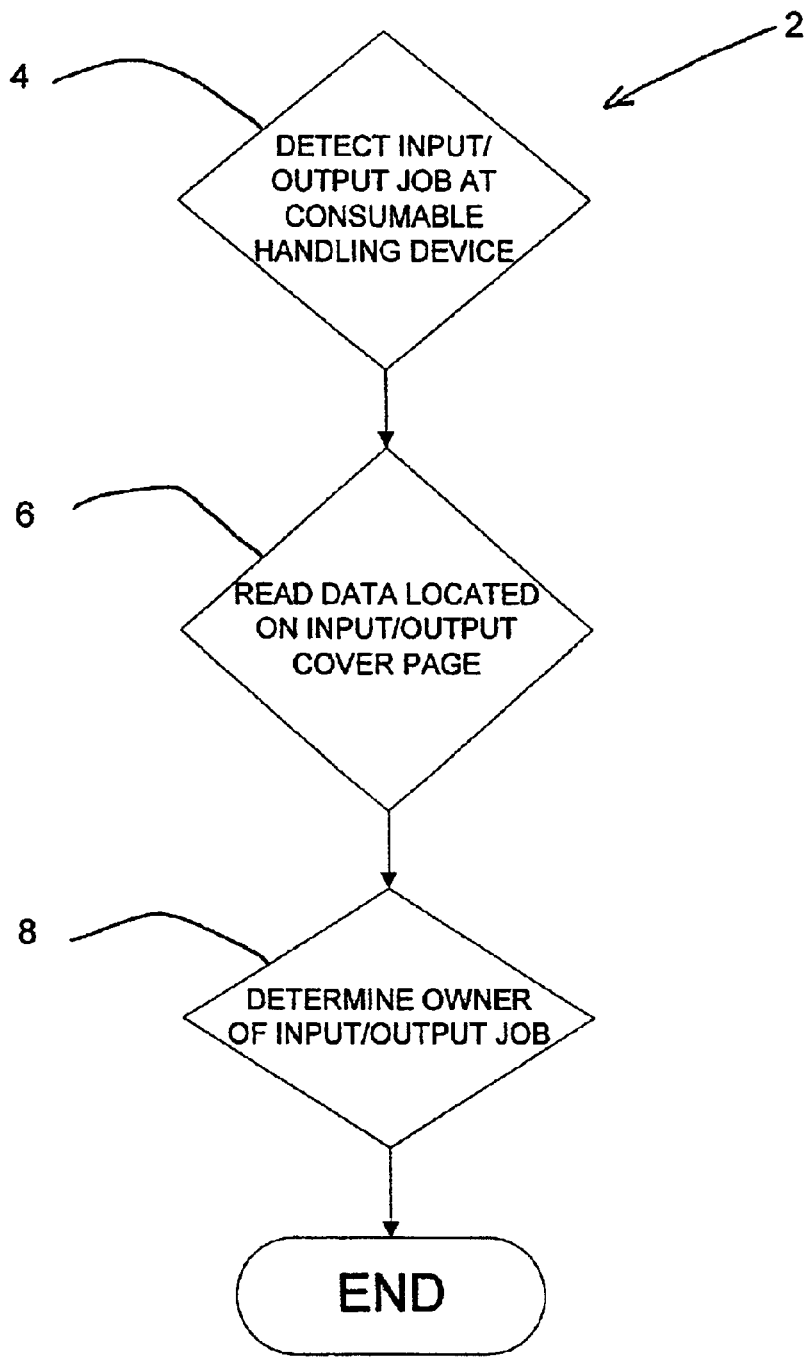
FIG. 1 is a flowchart that illustrates a method for automated input/output job tagging and distribution through the use of a self-propelled, mobile input/output bin (MIOB)

With reference to FIG. 1, there is illustrated one preferred embodiment for use of the concepts of this invention.

Method 2 includes, for example, the steps of detecting an input/output job at the consumable handling device (step 4), reading/scanning machine readable data located on an input/output job cover page means by the mobile, input/output bin (MIOB) (step 6), and conventionally determining an owner of the input/output job by the MIOB (step 8). It is to be understood that a list of input/output jobs may include, but is not limited to, a print job, a copy job, a scan job, a fax and/or or the like. It is also to be understood that a typical consumable handling device can be, but is not limited to, a printer, a printing device, a media handling device and/or the like. It is to be further understood that the phrase "printing device" can be, but is not limited to, facsimile machines, scanners, plotters or the like. It is to be even further understood that the phrase "cover page means" can be, but is not limited to, a cover page, a banner page or the like. Finally, it is to be understood that the machine readable data can be, but is not limited to, a bar code, magnetic ink, a RF tag, hand printing, mark-sense systems or the like.

With respect to the MIOB, it is envisioned that this device be a lightweight, autonomous, wheeled, cart-type robot that conventionally operates off of conventional, rechargeable batteries. During periods of use, the MIOB finds a docking station to conventionally recharge and possibly conventionally plug into a network link to exchange data with other MIOBs, printers, mailboxes or servers. The MIOB of the present invention is similar in some respects to the mailroom robots discussed above. However, a significant difference is that the MIOB of the present invention is designed to service all types of consumable handling devices, not just printers.

It is to be understood that the MIOB can be outfitted so as to service various consumable handling devices. For example, the MIOB can be equipped with a locked bin that provides security as the input/output job is transferred to its final destination. Another MIOB can be fitted with a conventional location device so that the location/destination of the MIOB can be constantly monitored.

A further advantageous aspect of the present invention will now be described with respect to the passive/active nature of the present invention. For example, if a printer prints a print job, the printer can conventionally contact a data center (not shown) and inform the data center that that particular printer has a print job to be picked up. The data center then contacts and sends a MIOB. The MIOB proceeds to that printer and picks up the print job. The MIOB scans the cover page on the input/output job and determines the owner of the input/output job. The MIOB then transfers the print job to the owner, such as a copier if the print job is to be copied. While the copier example has been used, it is to be understood that the MIOB could also be used to transfer the print job to a scanner, a facsimile machine, another printer, a user or the like.

It is to be understood that various conventional communication techniques between the consumable handling device, data center, and MIOB can be employed. For example, conventional wireless techniques can be employed. Also, a variety of hardwired communication systems can be used.

Figure 2:
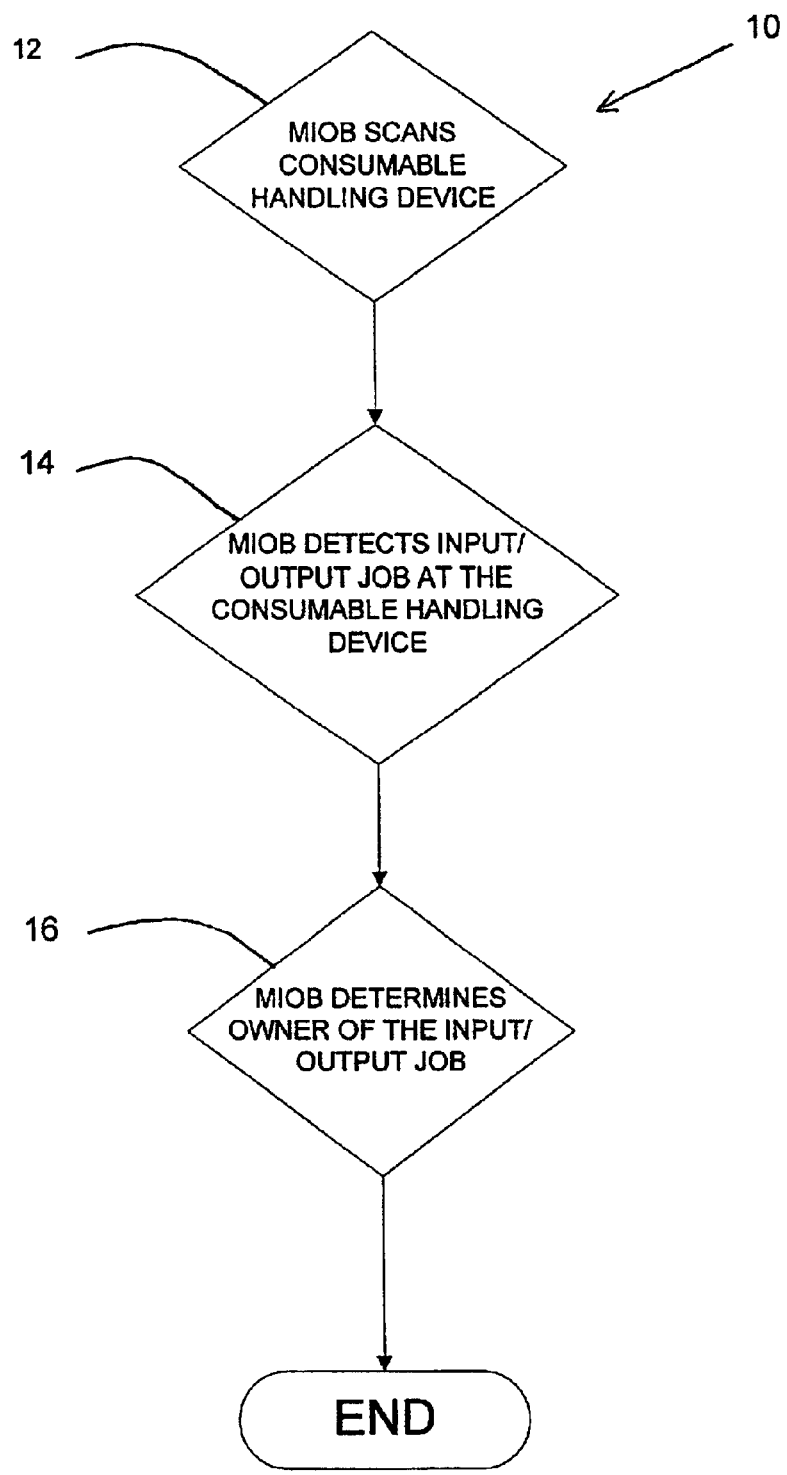
FIG. 2 is a flowchart that an active method for automated input/output job tagging and distribution through the use of a self-propelled, mobile input/output bin (MIOB).

The MIOB can also be utilized in an active manner (Method 10 in FIG. 2). For example, a MIOB that is solely dedicated to transferring print jobs to copiers constantly moves about and conventionally scans/monitors the various printers and/or printing devices in order to determine if the printer and/or printing device has printed out a print job that is to be copied (step 12). If the printer and/or printing device have printed out a print job it may, for example, conventionally emit a signal that can be detected by the MIOB (step 14). The MIOB then reads the machine readable data located on the cover/banner page of the input/output job and transfers the print job to the designated owner (step 16). It is to be understood that variously equipped MIOBs could be used to roam a particular area and scan/monitor the various consumable handling devices in order to determine if an input/output job exists in any of the consumable handling devices. In fact, such active MIOBs could be utilized in off hours and/or during the weekends in order to service the consumable handling devices without adversely affecting the workforce.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for automated input/output job distribution, comprising the steps of:

detecting an input/output job at a consumable handling device;

reading a machine readable data located on an input/output job cover page means by a self-propelled, mobile input/output bin; and determining an owner of the input/output job through the use of the bin.

2. The method, as in claim 1, wherein said detecting step is further comprised of the step of:

contacting a data center of said input/output job.

3. The method, as in claim 1, wherein said detecting step is further comprised of the step of:

scanning/monitoring said consumable handling device to detect said input/output job.

4. The method, as in claim 1, wherein said consumable handling device is further comprised of:

a printer.

5. The method, as in claim 1, wherein said consumable handling device is further comprised of:

a printing device.

6. The method, as in claim 1, wherein said method is further comprised of the step of:

outfitting said bin with a locking means.

7. The method, as in claim 1, wherein said detecting step is further comprised of the step of:

wirelessly detecting said input/output job.

8. The method, as in claim 1, wherein said cover page moans is further comprised of:

a banner page.

9. A method for passively automating an input/output job distribution, comprising the steps of:

detecting an input/output job at a consumable handling device;

contacting a self-propelled, mobile input/output bin; and sending said bin to said consumable handling device to read a machine readable data located on a job cover page means in order to transfer said job to an owner of said job through the use of said bin.

10. The method, as in claim 9, wherein said consumable handling device is further comprised of:

a printer.

11. The method, as in claim 9, wherein said consumable handling device is further comprised of:

a printing device.

12. The method, as in claim 9, wherein said method is further comprised of the step of:

outfitting said bin with a locking means.

13. The method, as in claim 9, wherein said detecting step is further comprised of the step of:

wirelessly detecting said input/output job.

14. The method, as in claim 9, wherein said cover page means is further comprised of:

a banner page.

15. A method for actively automating an input/output job distribution, comprising the steps of:

scanning/monitoring a consumable handling device by a self-propelled, mobile input/output bin;

detecting an input/output job at said consumable handling device by said bin; and determining an owner of said job by reading machine readable data located on a cover page means of said job through the use of said bin.

16. The method, as in claim 15, wherein said consumable handling device is further comprised of:

a printer.

17. The method, as in claim 15, wherein said consumable handling device is further comprised of:

a printing device.

18. The method, as in claim 15, wherein said method is further comprised of the step of:

outfitting said bin with a locking means.

19. The method, as in claim 15, wherein said detecting step is further comprised of the step of:

wirelessly detecting said input/output job.

20. The method, as in claim 15, wherein said cover page means is further comprised of:

a banner page.

* * * * *